(12) United States Patent
Han et al.

(10) Patent No.: US 10,425,801 B2
(45) Date of Patent: Sep. 24, 2019

(54) METHOD AND DEVICE FOR PROVIDING CONTENTS IN COMMUNICATION SYSTEM

(71) Applicant: Samsung Electronics Co., Ltd., Gyeonggi-do (KR)

(72) Inventors: Se-Hee Han, Seoul (KR); In-Young Shin, Seoul (KR); Kiran Bharadwaj Vedula, Bangalore (IN); A-Ram Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/123,923

(22) PCT Filed: Mar. 4, 2015

(86) PCT No.: PCT/KR2015/002090
§ 371 (c)(1),
(2) Date: Sep. 6, 2016

(87) PCT Pub. No.: WO2015/133818
PCT Pub. Date: Sep. 11, 2015

(65) Prior Publication Data
US 2017/0026820 A1    Jan. 26, 2017

Related U.S. Application Data

(60) Provisional application No. 61/947,728, filed on Mar. 4, 2014.

(30) Foreign Application Priority Data

Mar. 14, 2014    (IN) .............................. 320/KOL/2014

(51) Int. Cl.
*H04W 8/00*    (2009.01)
*H04W 76/14*    (2018.01)
(Continued)

(52) U.S. Cl.
CPC ........... *H04W 8/005* (2013.01); *H04L 65/602* (2013.01); *H04L 65/607* (2013.01);
(Continued)

(58) Field of Classification Search
CPC ..... H04W 4/18; H04W 8/005; H04W 72/048; H04W 76/14; H04W 4/80; H04W 84/18;
(Continued)

(56) References Cited

U.S. PATENT DOCUMENTS 7,827,495 B2    11/2010    Bells et al.
9,154,534 B1 *    10/2015    Gayles .................... H04L 65/60
(Continued)

FOREIGN PATENT DOCUMENTS

CA    2 867 783    10/2013
CN    1697412    11/2005
(Continued)

OTHER PUBLICATIONS

PCT/ISA/210 Search Report issued on PCT/KR2015/002090 (pp. 3).
(Continued)

*Primary Examiner* — Mehmood B. Khan
(74) *Attorney, Agent, or Firm* — The Farrell Law Firm, P.C.

(57) ABSTRACT

A method for providing contents in a communication system according to an embodiment of the present invention comprises the steps of: discovering multiple synchronization devices which will communicate with a source device and identifying device types of the discovered multiple synchronization devices; generating multiple contents for the multiple synchronization devices on the basis of the identified device types; and providing each of the generated multiple contents to a corresponding synchronization device, wherein
(Continued)

each of the device types is determined according to at least one among the capacity, type, and function of the device.

8 Claims, 5 Drawing Sheets

(51) Int. Cl.
| | |
|---|---|
| *H04W 4/80* | (2018.01) |
| *H04W 4/18* | (2009.01) |
| *H04W 72/04* | (2009.01) |
| *H04L 29/08* | (2006.01) |
| *H04L 29/06* | (2006.01) |
| *H04W 8/22* | (2009.01) |
| *H04W 84/18* | (2009.01) |

(52) U.S. Cl.
CPC .......... *H04L 67/1095* (2013.01); *H04W 4/18* (2013.01); *H04W 4/80* (2018.02); *H04W 72/048* (2013.01); *H04W 76/14* (2018.02); H04L 65/4092 (2013.01); H04L 65/608 (2013.01); H04L 67/1068 (2013.01); *H04W 8/22* (2013.01); *H04W 84/18* (2013.01)

(58) Field of Classification Search
CPC ...... H04W 8/22; H04L 65/602; H04L 65/607; H04L 67/1095; H04L 65/4092; H04L 65/608; H04L 67/1068
See application file for complete search history.

(56) References Cited

U.S. PATENT DOCUMENTS

| | | | |
|---|---|---|---|
| 9,253,520 B2* | 2/2016 | Shoemake | H04N 5/23206 |
| 9,270,935 B2* | 2/2016 | Igoe | H04L 12/2809 |
| 9,298,334 B1* | 3/2016 | Zimmerman | G06F 3/048 |
| 9,699,500 B2* | 7/2017 | Kafle | H04L 67/1044 |
| 2004/0267965 A1 | 12/2004 | Vasudevan et al. | |
| 2005/0050474 A1* | 3/2005 | Bells | G06F 8/38 |
| | | | 715/747 |
| 2005/0254524 A1* | 11/2005 | An | H04L 12/2803 |
| | | | 370/487 |
| 2008/0320539 A1* | 12/2008 | Ohkita | H04N 21/43615 |
| | | | 725/118 |
| 2011/0047214 A1 | 2/2011 | Lee et al. | |
| 2011/0107388 A1* | 5/2011 | Lee | H04L 65/1066 |
| | | | 725/118 |
| 2012/0224101 A1* | 9/2012 | Pouw | G05B 19/0426 |
| | | | 348/554 |
| 2013/0179605 A1* | 7/2013 | Huang | H04L 65/4092 |
| | | | 710/20 |
| 2013/0234913 A1 | 9/2013 | Thangadorai et al. | |
| 2013/0238702 A1 | 9/2013 | Sheth et al. | |
| 2014/0059263 A1 | 2/2014 | Rosenberg et al. | |
| 2014/0096165 A1* | 4/2014 | Bei | H04N 19/46 |
| | | | 725/81 |
| 2014/0210693 A1* | 7/2014 | Bhamidipati | H04L 65/4092 |
| | | | 345/2.3 |
| 2014/0223490 A1* | 8/2014 | Pan | H04N 21/42224 |
| | | | 725/61 |
| 2015/0071147 A1* | 3/2015 | Yamaura | H04M 1/7253 |
| | | | 370/311 |
| 2015/0085847 A1 | 3/2015 | Yamaura | |
| 2015/0094072 A1 | 4/2015 | Yamaura | |
| 2015/0172757 A1* | 6/2015 | Kafle | H04L 67/1044 |
| | | | 725/81 |
| 2015/0179143 A1* | 6/2015 | Subramaniam | H04L 67/025 |
| | | | 345/2.3 |
| 2015/0195334 A1* | 7/2015 | Chew | G06F 3/0482 |
| | | | 705/40 |
| 2015/0296416 A1* | 10/2015 | Lee | H04W 8/005 |
| | | | 370/331 |
| 2015/0382287 A1* | 12/2015 | Kim | H04W 76/14 |
| | | | 370/338 |
| 2016/0338125 A1* | 11/2016 | Kim | H04L 67/16 |
| 2017/0332134 A1* | 11/2017 | Iwami | H04N 21/436 |

FOREIGN PATENT DOCUMENTS

| | | |
|---|---|---|
| CN | 102484779 | 5/2012 |
| CN | 103150132 | 6/2013 |
| CN | 103368935 | 10/2013 |
| WO | WO 2011112033 | 9/2011 |
| WO | WO 2013153887 | 10/2013 |

OTHER PUBLICATIONS

PCT/ISA/237 Written Opinion issued on PCT/KR2015/002090 (pp. 6).
Wi-Fi Alliance, "Wi-Fi Certified Miracast TM: Extending the Wi-Fi Experience to Seamless Video Display", XP-002700078, Internet Citation, Sep. 19, 2012, 18 pages.
Wi-Fi Alliance, "Wi-Fi Peer-to-Peer (P2P) Technical Specification V1.1", XP-009163866, Internet Citation, Jan. 1, 2010, 159 pages.
Wi-Fi Alliance, "Wi-Fi Alliance Technical Committee Wi-Fi Display Technical Task Group Wi-Fi Display Technical Specification V1.0.0", XP-055320680, Jan. 1, 2012, 149 pages.
European Search Report dated Jul. 20, 2017 issued in counterpart application No. 15759190.0-1853, 11 pages.
European Search Report dated Mar. 19, 2018 issued in counterpart application No. 15759190.0-1213, 11 pages.
Chinese Office Action dated Sep. 30, 2018 issued in counterpart application No. 201580011897.0, 10 pages.

\* cited by examiner

METHOD AND DEVICE FOR PROVIDING CONTENTS IN COMMUNICATION SYSTEM

PRIORITY

This application is a National Phase Entry of PCT International Application No. PCT/KR2015/002090, which was filed on Mar. 4, 2015, and claims priority to U.S. Provisional Application No. 61/947,728, which was filed on Mar. 4, 2014, and Indian Patent Application No. 320/KOL/2014, which was filed on Mar. 14, 2014, the contents of each of which are incorporated herein by reference.

TECHNICAL FIELD

The present invention provides a method and device for providing contents having user interfaces (UIs) to each of multiple devices in a communication system.

BACKGROUND ART

Recent portable devices provide various functions that users need. For example, the portable devices provide a variety of functions, such as a call function, an image or video photographing function, a broadcast reception function, an internet access function, or the like.

Meanwhile, a recent portable device (hereinafter, referred to as "source device") provides a wireless image transmission function to transmit contents (that is, video, audio, text, application, or the like) to other device (hereinafter, referred to as "sink device") through a wireless communication (for example, Wi-Fi, Bluetooth, mobile communication network, or the like). There is the WiFi display (WFD), wireless display (WiDi), Miracast, or the like in the wireless image transmission function.

Using the wireless image transmission function, the source device can provide the same contents to multiple sink devices. However, since each of the multiple sink devices has a different device capacity, and a usage environment and user of each of the multiple sink devices may be different, contents having different UIs should be provided.

DETAILED DESCRIPTION OF THE INVENTION

Technical Problem

Therefore, the present invention has been made in view of the above-mentioned problems, and an aspect of the present invention is to provide a method and device for providing contents having different user interfaces (UIs) to each of multiple devices in a communication system.

Also, another aspect of the present invention is to provide a method and device for providing contents having different user interfaces (UIs) to each of multiple sink devices by a source device in a communication system.

Technical Solution

In accordance with an aspect of the present invention, there is provided a method for providing contents in a communication system including: discovering multiple sink devices that will communicate with a source device, and identifying types of the discovered multiple sink devices; generating multiple contents for the multiple sink devices on the basis of the identified device types; and providing each of the generated multiple contents to a corresponding sink device, the device types being determined according to at least one among the capacity, type, and function of the device.

In accordance with another aspect of the present invention, there is provided a device for providing contents in a communication system including: a control unit that discovers multiple sink devices that will communicate with a source device, identifies a device type of each of the discovered multiple sink devices, and generates multiple contents for the multiple sink devices, on the basis of the identified device type; and a transmitting/receiving unit that provides the generated multiple contents to the corresponding sink device, the device types being determined according to at least one among the capacity, type, and function of the device.

MODE FOR CARRYING OUT THE INVENTION

Hereinafter, an exemplary embodiment of the present invention will be described in detail with reference to the accompanying drawings. In the following description, it should be noted that only portions required for comprehension of operations according to the embodiments of the present invention will be described and descriptions of other portions will be omitted not to make subject matters of the present invention obscure.

A main aspect of the present invention is to provide contents having different user interfaces according to device types of multiple sink devices by a source device in a communication system, and in case that a user's control command occurs from at least one sink device, to regenerate contents according to the occurred control command.

To this end, a method and device for providing contents in a communication system according to an embodiment of the present invention will be described in detail.

Figure 1:
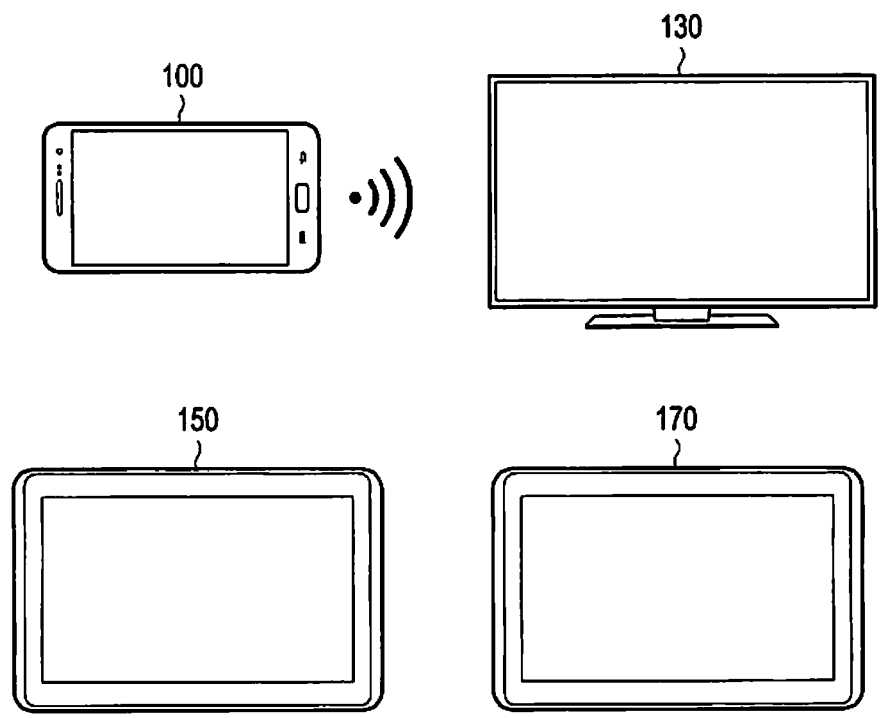
FIG. 1 is a view illustrating an example of a communication system to which an embodiment of the present invention is applied.

FIG. 1 illustrates an example of a communication system to which an embodiment of the present invention is applied. Although FIG. 1 illustrates a case that three sink devices are included in the communication system as an example, the embodiment of the present invention may be applied to all communication systems including at least one sink device.

Referring to FIG. 1, the communication system includes a source device 100 and multiple sink devices 130 to 170. The source device 100 may be a portable device having a relatively small screen, such as a mobile communication device, a smart phone, a tablet personal computer (PC), a portable multimedia player, a personal digital assistant (PDA), or the like. Each of the multiple sink devices 130 to 170 may be the same portable device as the source device 100, or may be an electronic device having a relatively large screen, such as a navigation, a notebook computer, or the like. Here, it is assumed that each of the multiple sink devices 130 to 170 has a different type from each other. For example, in case that the communication system of FIG. 1 is configured inside an automobile, the first sink device 130 may be a device mounted on a head unit (HU) of a driver's seat on the basis of an in vehicle infotainment (IVI) system, and the second sink device 150 and third sink device 170 may be devices mounted on rear seats of the automobile. Hereinafter, for the convenience of description, a case in which the communication system is configured inside the automobile will be described as an example. However, the embodiment of the present invention may be applied to all possible communication systems in which multiple sink devices having different types exist.

In the communication system of FIG. 1, the source device 100 provides contents to each of the multiple sink devices 130 to 170. At this time, the source device 100 may generate contents having different UIs according to device types of the multiple sink devices 130 to 170, and may transmit the contents to each of the multiple sink devices 130 to 170, respectively. The type of each of the multiple sink devices 130 to 170 may be different from each other according to the capacity, type, and function of the sink device. Accordingly, in the embodiments of the present invention, a method for generating and providing contents, by the source device 100, having different UIs according to types of the sink devices will be described.

Figure 2:
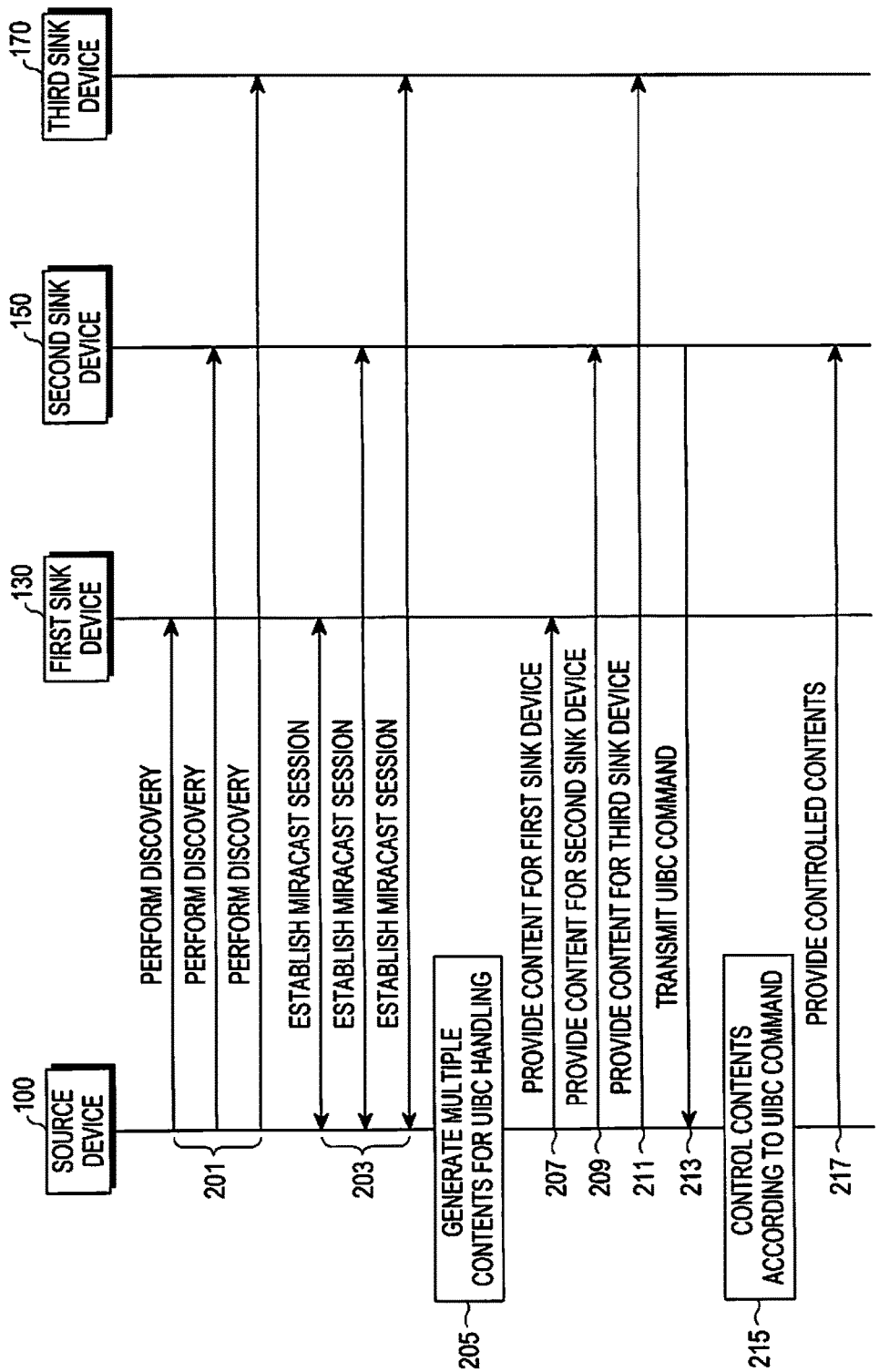
FIG. 2 is a view illustrating a method for providing contents in a communication system according to a first embodiment of the present invention.

FIG. 2 illustrates a method for providing contents in a communication system according to a first embodiment of the present invention.

Referring to FIG. 2, a source device 100 discovers each of a first sink device 130, a second sink device 150, and a third sink device 170 through a discovery procedure, and identifies types of the sink devices 130, 150, 170 (201). The source device 100 establishes a Miracast session having a real-time streaming protocol (RTSP) that is independent of each of the first sink device 130, second sink device 150, and third sink device 170 (203).

The source device 100 generates multiple contents for user backward seek (UIBC) handling on the basis of the type of each of the identified sink devices 130, 150, 170 (205). The device type may be determined on the basis of at least one among the capacity, type, and function of the device. For example, when the source device 100 is to provide an application to each of the sink devices 130, 150, 170, each of the generated multiple contents provides the same application, but has a different UI.

In accordance with this, the source device 100 provides a content having a UI for a first sink device type (that is, IVI system based device) to the first sink device 130 (207), provides a content having a UI for a second sink device type (that is, a device located on a rear seat of a driver) to the second sink device 150 (209), and provides a content having a UI for a third sink device type (that is, a device located on a rear seat of a driver) to the third sink device 170 (211).

Then, when the source device 100 receives a UIBC command from the second sink device 150 (213), the source device 100 controls the content according to the UIBC command (215). The source device 100 may provide the controlled (regenerated) content to the second sink device 150.

Accordingly, the source device 100 according to the first embodiment of the present invention may generate a content to have a UI according to a specification of a device (IVI system device) mounted on a driver's seat and may provide the content to the first sink device 130. Also, the source device 100 may differently control the contents according to UIBC commands of each of the sink devices 130, 150, 170.

Additionally, the source device 100 may provide a content having a UI for the first sink device type to the first sink device 130, and may provide contents having UIs for the second and third sink device types to the second and third sink devices 150, 170 at the same time. At this time, when a UIBC command for controlling the content provided from the third sink device 170 is input through the first sink device 130, the first sink device 130 transfers the input UIBC command to the source device 100. Then, the source device 100 may control the content of the third sink device 170 according to the input UIBC command and may provide the content to the third sink device 170.

Figure 3:
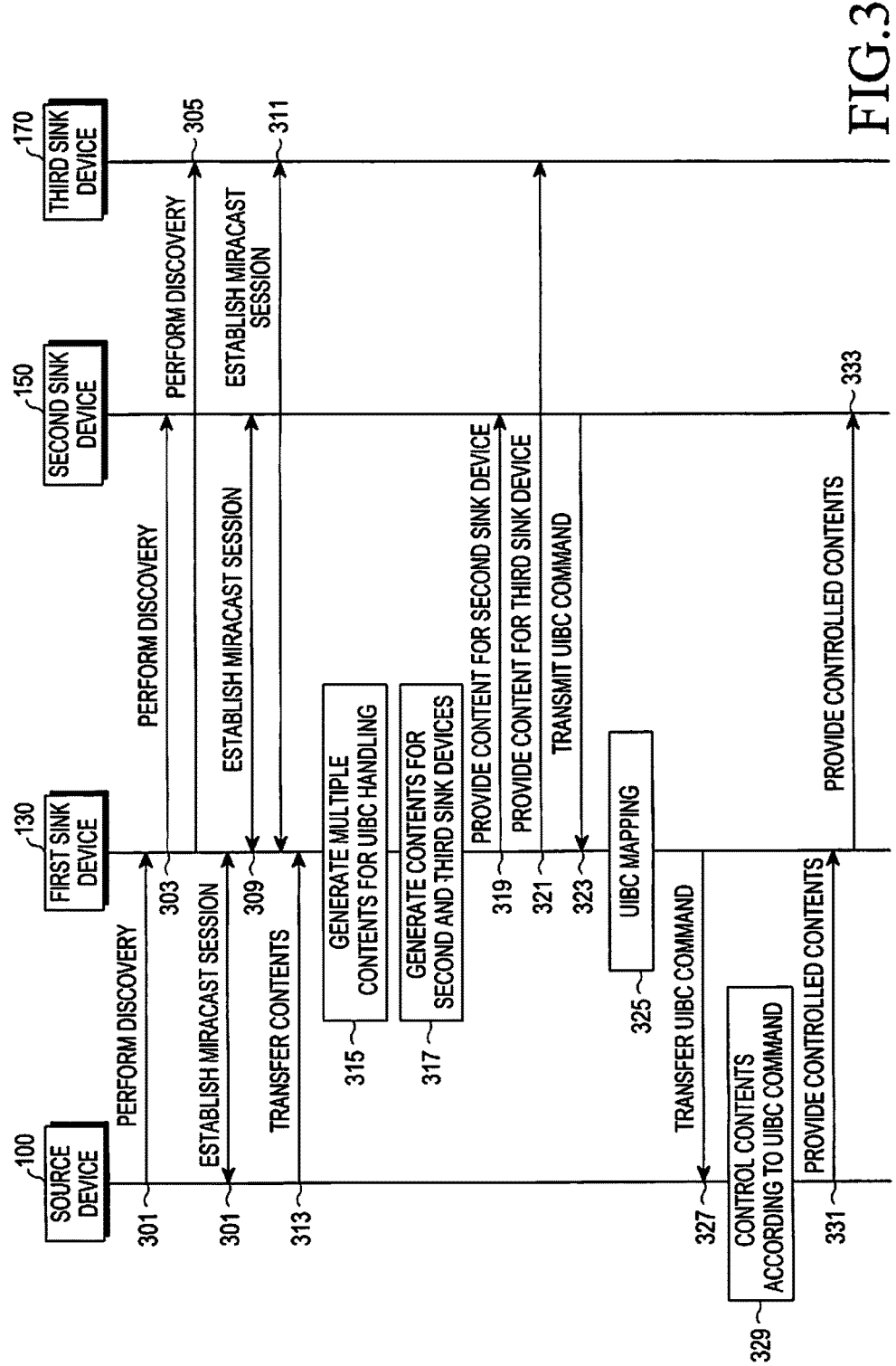
FIG. 3 is a view illustrating a method for providing a user interface (UI) in a communication system according to a second embodiment of the present invention.

FIG. 3 illustrates a method for providing a user interface (UI) in a communication system according to a second embodiment of the present invention. In the second embodiment, it is illustrated that a first sink device 130 may act as a sink device and as a source device in the communication system at the same time.

Referring to FIG. 3, the first sink device 130 discovers each of a source device 100, a second sink device 150, and a third sink device 170 through discovery procedure, and identifies types of the sink device 130, 150, 170 (301 to 305). Also, the first sink device 130 establishes a Miracast session having a real-time streaming protocol (RTSP) that is independent of each of the source device 100, second sink device 150, and third sink device 170 (307 to 311).

The source device 100 transfers a content provided from the source device 100 to the first sink device 130 without an additional process (313). The first sink device 130 identifies own device type and displays the content having a UI for the first sink device 130 through a display unit (not illustrated) (315). Also, the first sink device 130 generates contents for the corresponding devices on the basis of device types of each of the second sink device 150 and the third sink device 170 (317). The first sink device 130 provides the second sink device 150 with a content having a UI for the second sink device type (319), and provides the third sink device 170 with a content having a UI for the third sink device type (321).

Then, when the first sink device 130 receives a UIBC command from the second sink device 150 (323), the first sink device 130 maps whether the input UIBC command is input from which sink device (325). Also, the first sink device 130 transfers to the source device 100 that the UIBC command is input from the second sink device 150 (327). Then, the source device 100 controls the content according to the transferred UIBC command, and transfers the controlled content to the first sink device 130 (331). In accordance with this, the first sink device 130 provides the controlled content that is transferred from the source device 100 to the second sink device 150 (333).

Accordingly, since the first sink device 130 according to the second embodiment of the present invention can act as both of the source device and sink device, the first sink device 130 can provide a content to a user of the first sink device 130 and can provide contents to the second and third sink devices 150, 170 at the same time.

Figure 4:
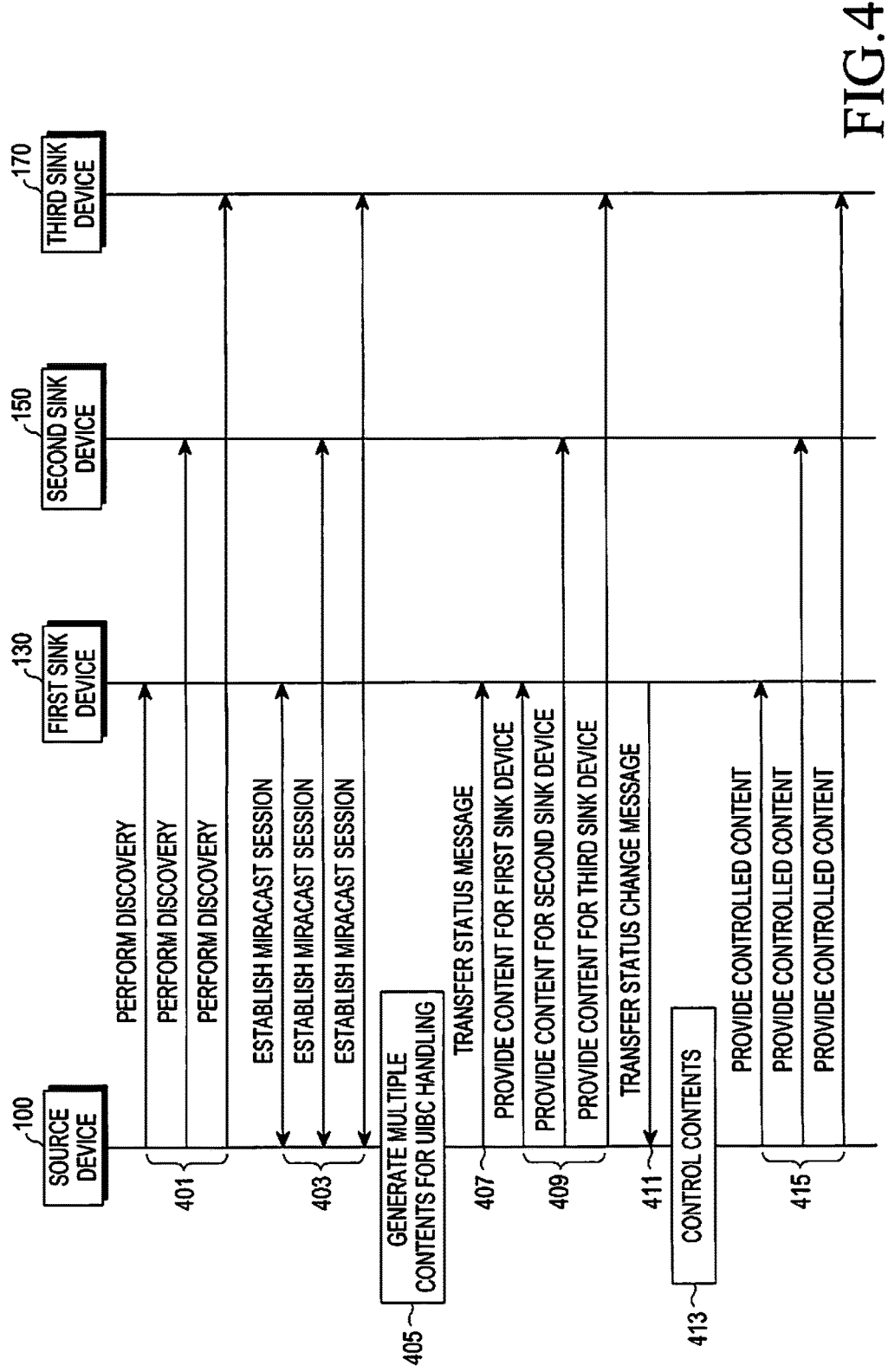
FIG. 4 is a view illustrating a method for providing a user interface (UI) in a communication system according to a third embodiment of the present invention.

FIG. 4 illustrates a method for providing a user interface (UI) in a communication system according to a third embodiment of the present invention.

Referring to FIG. 4, a source device 100 discovers a first sink device 130, a second sink device 150, and a third sink device 170 through discovery procedure, and identifies types of the sink devices 130, 150, 170 (401). The source device 100 establishes a Miracast session having a real-time streaming protocol (RTSP) that is independent of each of the first sink device 130, second sink device 150, and third sink device 170 (403).

The source device 100 generates multiple contents for user backward seek handling on the basis of the identified device types of each of the sink devices 130, 150, 170 (405). The device type may be determined on the basis of at least one among the capacity, type, and function of the device. For example, when the source device 100 is to provide an application to each of the sink devices 130, 150, 170, each of the generated multiple contents provides the same application, but has a different UI.

The source device 100 receives an RTSP establishment parameter message including a status of the first sink device 130 (407). At this time, when the status of the first sink device 130 is an initial status (for example, a status that a device power is turned on), the source device 100 provides the first sink device 130 with a content having a UI for the first sink device type, provides the second sink device 150 with a content having a UI for the second sink device type, and provides the third sink device 170 with a content having a UI for the third sink device type (409).

Then, when the source device 100 receives an RTSP establishment parameter message including information on a status change of the first sink device 130 from the first sink device 130, the source device 100 controls (regenerates) the contents for each of the sink devices 130 to 170 on the basis of the information on the status change (413). At this time, in each of the controlled contents, the UI for the corresponding device type is not changed.

The status change means that the present status is changed as compared to the previous status, for example, the status change may occur when an automobile starts or stops. Also, the information on the status change may be indicated as a change level (for example, low, medium, high).

The source device 100 provides contents which are controlled for each of the first to third sink devices 130 to 170 to the corresponding device (415).

Accordingly, the source device 100 according to the third embodiment of the present invention may generate and control contents of all sink devices according to the status of the first sink device 130.

Figure 5:
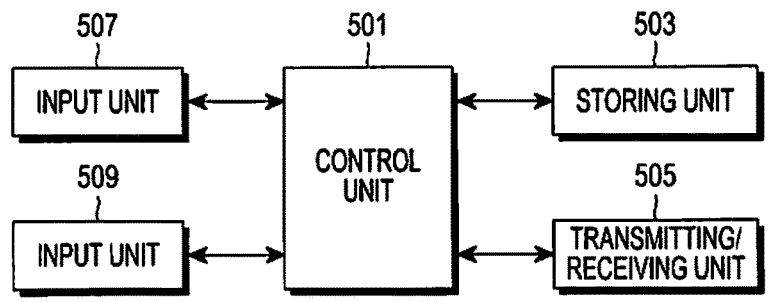
FIG. 5 is a view illustrating a configuration of a source device or a sink device according to an embodiment of the present invention.

FIG. 5 illustrates a configuration of a source device or sink device according to an embodiment of the present invention.

Referring to FIG. 5, one device includes a control unit 501, a storing unit 503, a transmitting/receiving unit 504, an input unit 507, and a display unit 509. Here, the input unit 507 and display unit 509 may be composed of one unit according to a type of a device, and each of a transmitting unit and receiving unit of the transmitting/receiving unit 505 may be composed of a separated unit.

The input unit 507 may include multiple input keys and function keys for receiving number information or text information and establishing and controlling functions, and may be formed of any one or a combination thereof from input means, such as a touch key, touch pad, touch screen, or the like. Especially, when the input unit 507 according to the embodiment of the present invention receives a UIBC command that controls a play location of the content from a user through the function keys, the input unit 507 generates an event signal corresponding to the input UIBC command and transfers the event signal to the control unit 501. Also, the display unit 509 plays the corresponding contents by a control of the control unit 501.

The control unit 501 controls the overall operations of generating and providing contents according to the first to third embodiments of the present invention. Especially, when the device illustrated in FIG. 5 performs a function of a source device, the control unit 501 discovers at least one sink device through the transmitting/receiving unit 505, and identifies a type of the discovered sink device. Also, the control unit 501 establishes a Miracast session having an RTSP that is independent of each of the sink devices discovered by the transmitting/receiving unit 505. Also, the control unit 501 generates multiple contents for UIBC handling on the basis of the identified types of the sink devices and provides the generated multiple contents to the corresponding sink device, respectively. When the control unit 501 receives a control command controlling the contents from at least one other devices, the control device 501 controls the corresponding contents according to the received control command. Also, the control unit 501 provides the controlled contents to the corresponding device through the transmitting/receiving unit 505.

Figure 6:
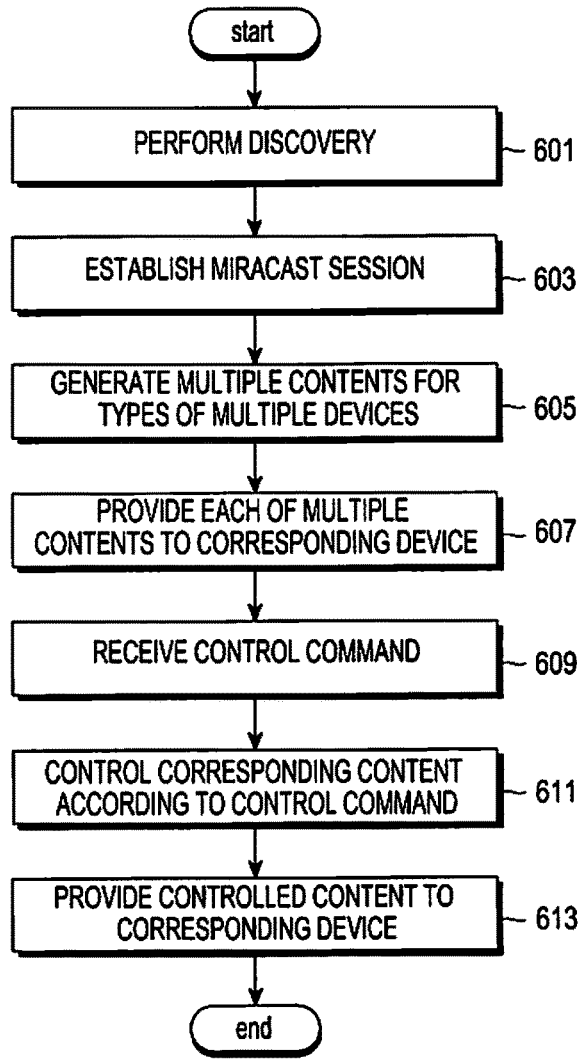
FIG. 6 is a view illustrating an operation of a source device according to an embodiment of the present invention.

FIG. 6 illustrates an operation of a source device according to an embodiment of the present invention.

Referring to FIG. 6, the source device discovers at least one sink device, and identifies types of the discovered sink devices (601). The source device establishes a Miracast session having an RTSP that is independent of each of the discovered sink devices (603). Also the source device generates multiple contents for UIBC handling on the basis of the identified types of the sink devices (605), and provides each of the generated multiple contents to the corresponding sink device, respectively (607).

Then, when the source device receives a control command for controlling the playing contents from at least one sink device (609), the source device controls the corresponding contents according to the received control command (611). Also, the source device provides the controlled contents to the corresponding device (613). Here, the control command may be received through the UIBC command according to the first and second embodiments of the present invention, or may be received through an RTSP establishment parameter message according to the third embodiment of the present invention.

Accordingly, the source device according to the embodiments of the present invention can generate and provide contents to have different UIs according to types of the sink devices. Also, the source device can provide different contents to multiple sink devices according to control commands transferred from the sink devices.

Although the embodiment has been described in the detailed description of the present invention, the present invention may be modified in various forms without departing from the scope of the present invention. Thus, the scope of the present invention shall not be determined merely based on the described exemplary embodiments and rather determined based on the accompanying claims and the equivalents thereto.

The invention claimed is:

1. A method for providing contents, by a source device, in a communication system, the method comprising:
   discovering a plurality of sink devices that support to communicate with the source device;
   identifying device types for the discovered plurality of sink devices;

establishing an independent miracast session using a real-time streaming protocol (RTSP) with each of the discovered plurality of sink devices;

generating a plurality of contents for the discovered plurality of sink devices, each of the plurality of contents providing an identical application and having a user interface generated based on each of the device types;

providing each of the generated plurality of contents through the independent miracast session; and in case that status change information is received from a first sink device, controlling the plurality of contents in response to the status change information and providing the controlled plurality of contents to the discovered plurality of sink devices, wherein the device types are identified based on at least one of a capacity and a function of each of the discovered plurality of sink devices.

2. The method of claim 1, wherein one sink device of the discovered plurality of sink devices performs a function of the source device.

3. The method of claim 1, wherein the status change information is received through a user backward seek (UIBC) command or an RTSP establishment parameter message.

4. The method of claim 3, wherein the RTSP establishment parameter message includes current status information of the first sink device, and the current status information is indicated as a change level.

5. A device for providing contents in a communication system, the device comprising:

a controller configured to:

discover a plurality of sink devices that support to communicate with the source device, identify device types for the discovered plurality of sink devices, establish an independent miracast session using a real-time streaming protocol (RTSP) with each of the discovered plurality of sink devices, and generate a plurality of contents for the discovered plurality of sink devices, each of the plurality of contents providing an identical application and having a user interface generated based on each of the device types, and a transceiver configured to provide each of the generated plurality of contents through an independent miracast session, wherein, in case that status change information is received from a first sink device, the controller is further configured to control the plurality of contents in response to the status change information and the transceiver is configured to provide the controlled plurality of contents to the discovered plurality of sink devices, and wherein the device types are identified based on at least one of a capacity and a function of each of the discovered plurality of sink devices.

6. The device of claim 5, wherein one sink device of the discovered plurality of sink devices performs a function of the source device.

7. The device of claim 5, wherein the status change information is received through a user backward seek (UIBC) command or an RTSP establishment parameter message.

8. The device of claim 5, wherein the RTSP establishment message includes current status information of the first sink device, and the current status information is indicated as a change level.

* * * * *